United States Patent [19]
Ackroyd

[11] 3,854,391
[45] Dec. 17, 1974

[54] APPARATUS FOR USE IN PREPARING COOKED MEAT

[75] Inventor: Harry Briggs Ackroyd, Bletchley, England

[73] Assignee: Scot Meat Products Limited, Bletchley, Milton Keynes, England

[22] Filed: Apr. 27, 1973

[21] Appl. No.: 355,208

Related U.S. Application Data

[60] Continuation-in-part of Ser. No. 197,810, Nov. 11, 1971, abandoned, which is a division of Ser. No. 11,267, Feb. 13, 1970, Pat. No. 3,638,554.

[30] Foreign Application Priority Data
Feb. 13, 1969 Great Britain.................7880/69

[52] U.S. Cl............. 99/349, 100/90, 100/219, 100/232, 100/244, 100/295, 100/DIG. 10, 141/7, 141/73
[51] Int. Cl............. A47j 27/20, B30b 7/00
[58] Field of Search......... 99/349, 351; 426/407; 100/90, 232, 219, 244, 295, DIG. 10, 229 R, 249; 53/124 D; 141/7, 8, 12, 73, 283; 17/32

[56] References Cited
UNITED STATES PATENTS

| | | | |
|---|---|---|---|
| 2,696,443 | 12/1954 | Allbright..................... | 100/DIG. 10 |
| 2,912,924 | 11/1959 | Dahl et al.................. | 100/DIG. 10 |
| 2,946,166 | 7/1960 | Baxter....................... | 100/244 |
| 3,039,136 | 6/1962 | Toepper et al............. | 100/DIG. 10 |
| 3,039,382 | 6/1962 | Simon et al................ | 100/DIG. 10 |
| 3,040,654 | 6/1962 | Opie.......................... | 100/DIG. 10 |
| 3,548,890 | 12/1970 | Langen..................... | 141/7 |
| 3,604,339 | 9/1971 | Beck et al.................. | 99/349 |

*Primary Examiner*—Billy J. Wilhite
*Attorney, Agent, or Firm*—Baldwin, Wight & Brown

[57] ABSTRACT

Cooked meat in units having uniform cross-section and quality is prepared by arranging meat in a trough, evacuating the trough and compressing the meat therein into a unit of the desired cross-section, sliding the unit of meat bodily into a container of the desired cross-section whilst maintaining compression and cooking and cooling the meat whilst maintaining compression thereon. A container is used comprising a tubular body containing two slidable plugs between which the meat is confined, and a spring maintaining pressure on the meat, and a meat press to fill the containers comprising an evacuable trough in which the meat is arranged, and oppositely acting pistons of unequal force operative to compress the meat in the trough and slide it bodily from the trough into the container.

9 Claims, 9 Drawing Figures

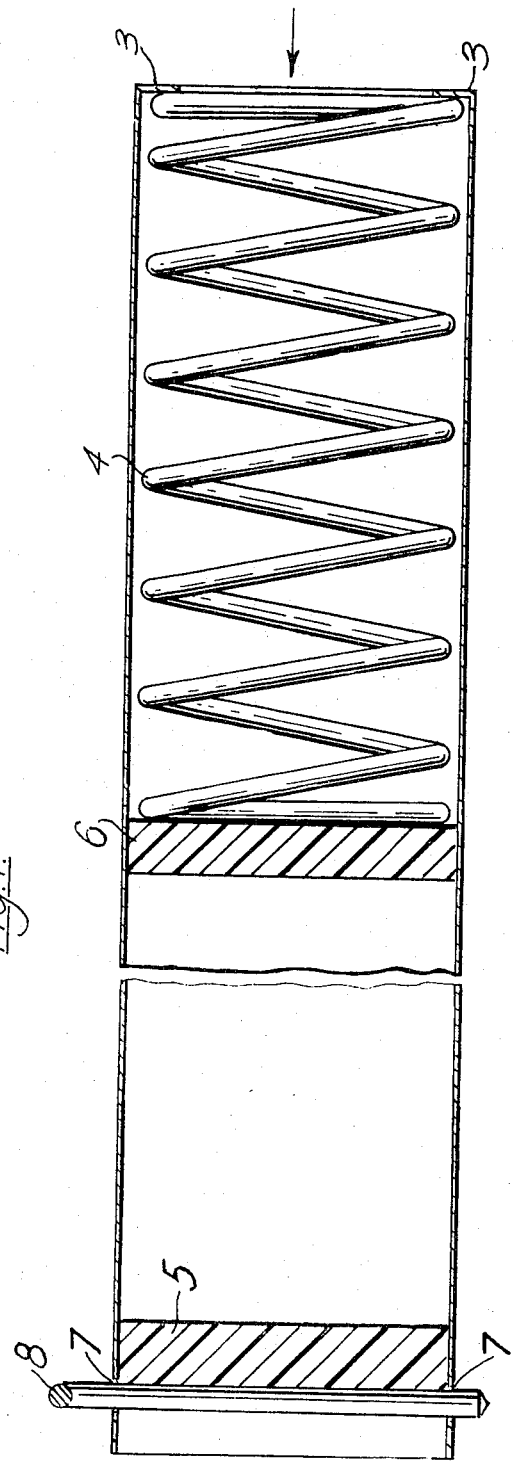

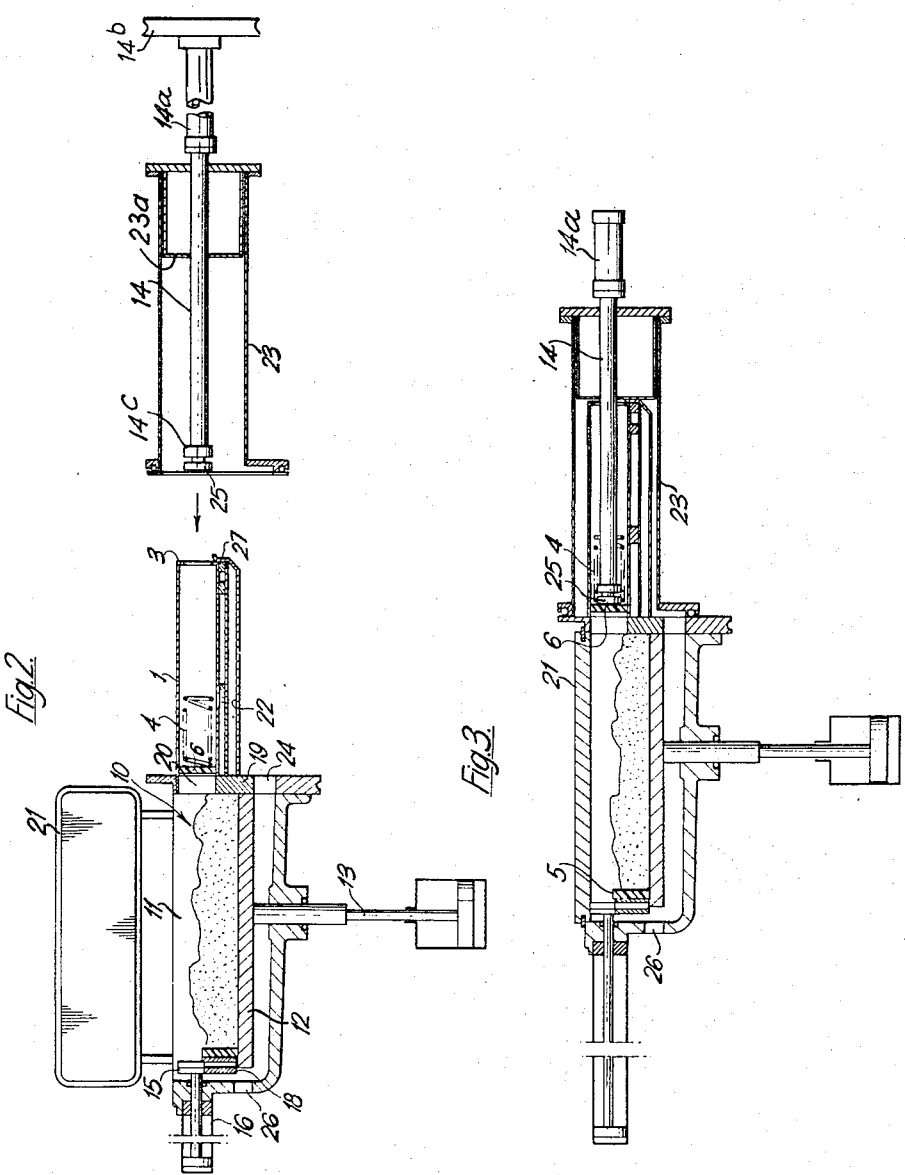

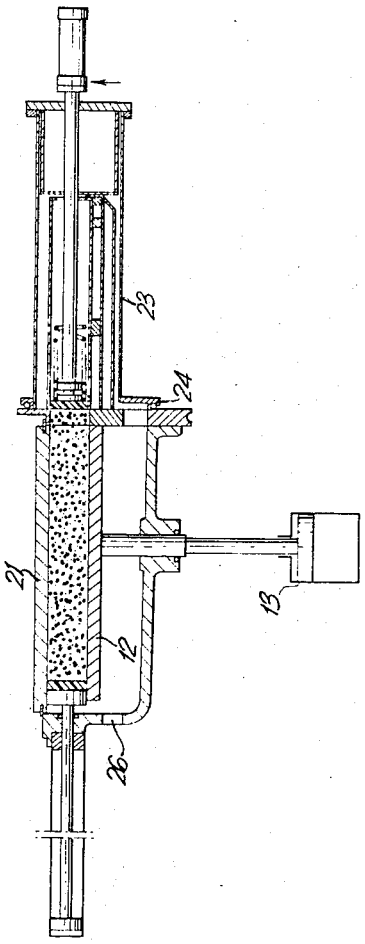
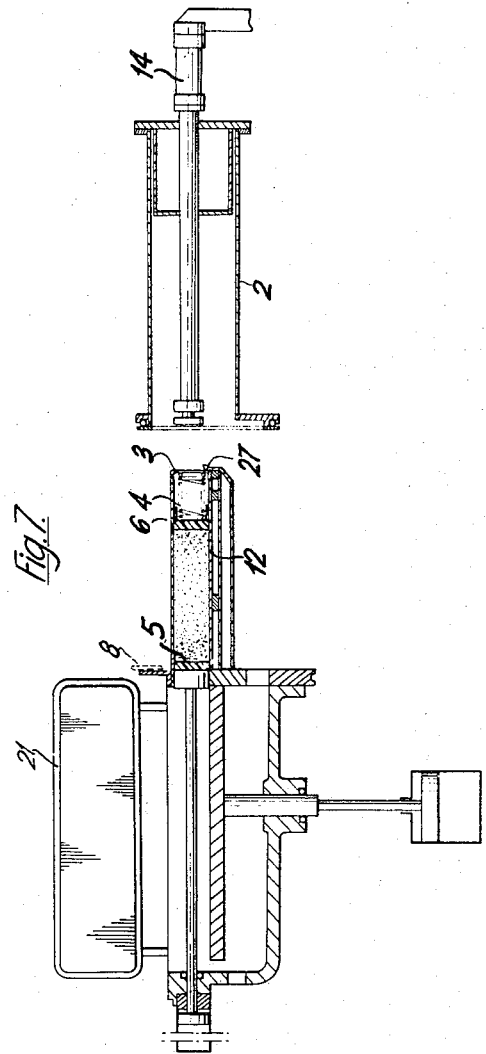

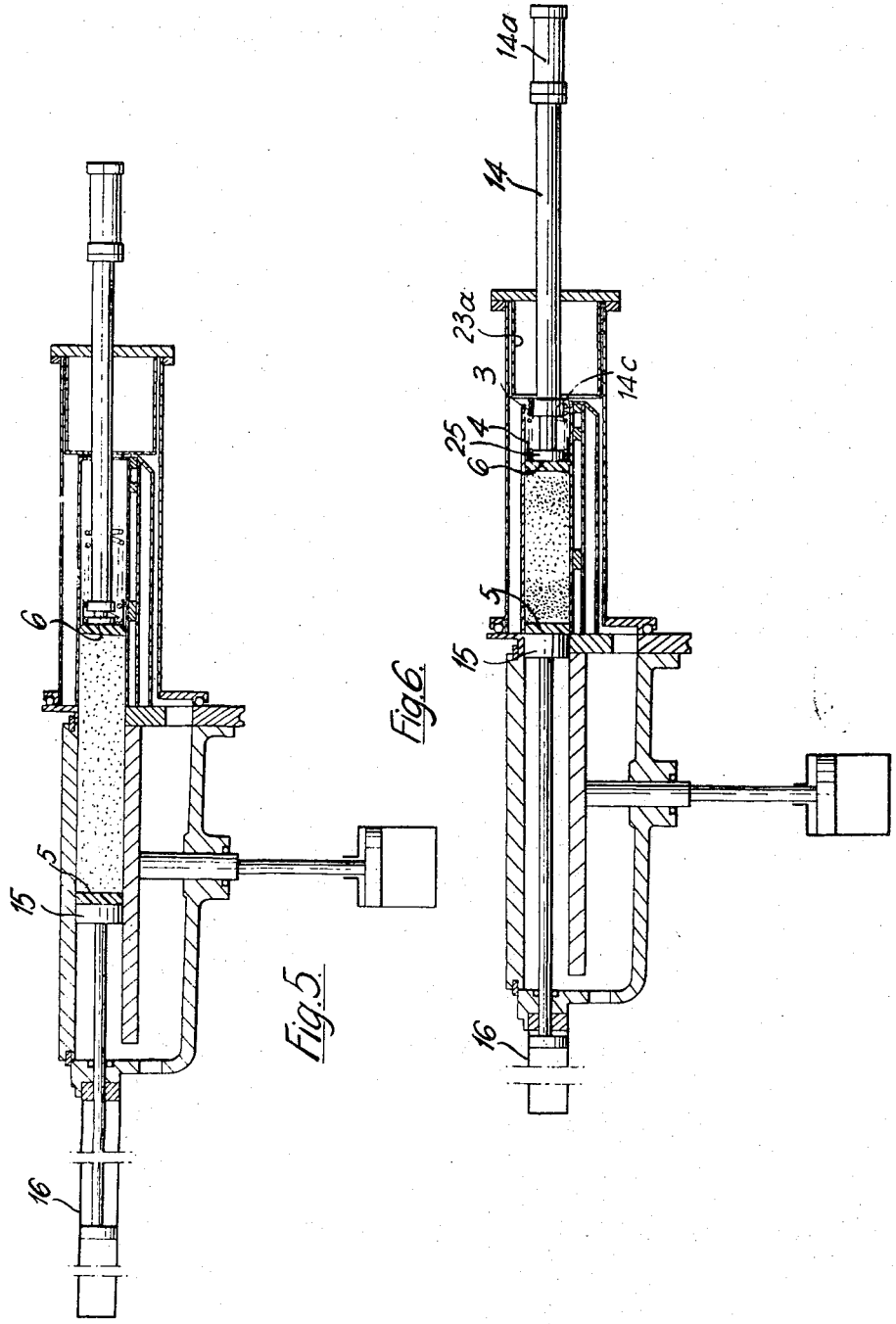

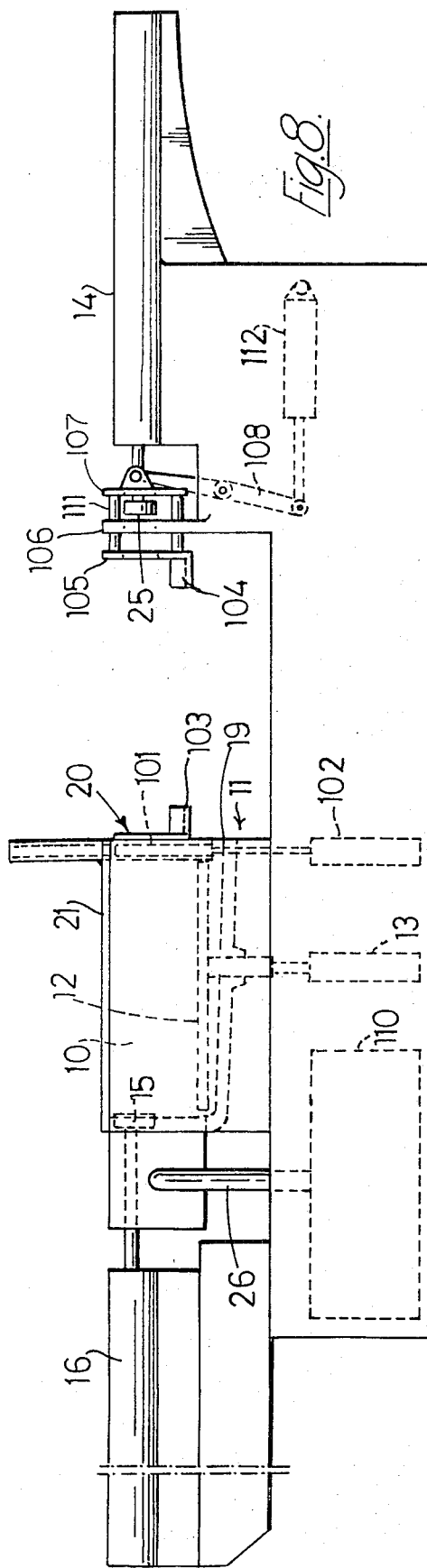
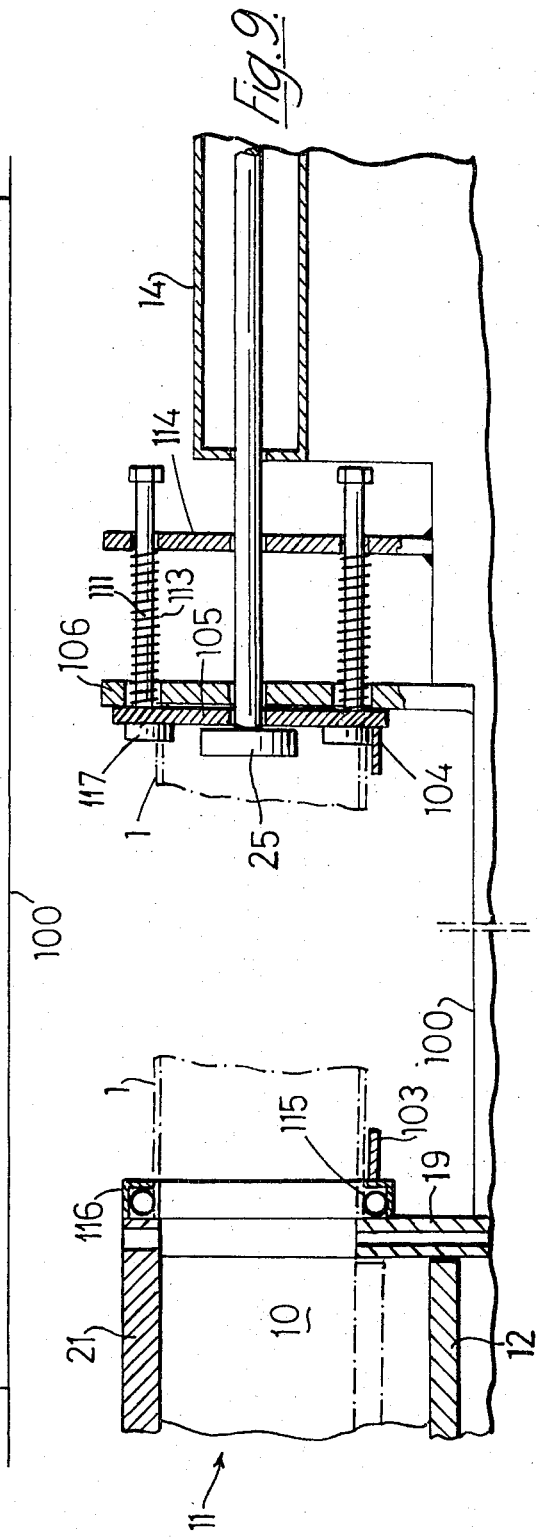

ns sec. 3,854,391

APPARATUS FOR USE IN PREPARING COOKED MEAT

This application is a continuation in part of my application Ser. No. 197,810, filed Nov. 11, 1971, now abandoned, which was a division of my application Ser. No. 11,267, filed Feb. 13, 1970, entitled PRODUCTION OF COOKED MEATS, now U.S. Pat. No. 3,638,554.

This invention relates to the preparation of cooked meats, for example ham and related beef and pork products, both cured and fresh.

There is a demand in the meat products industry for cooked meats which can be sliced to provide accurately controlled portions having uniform size, weight and quality.

This requires in effect that the cooked meat concerned be provided in units of uniform cross section in which the distribution of fat and lean and the direction of the grain of the meat is reasonably uniform throughout the length of the unit, so that successive slices of predetermined thickness will have the same bulk density and quality.

Hitherto, units of uniform cross section have been provided by pressing the meat concerned into containers or cans prior to cooking or pasteurization, the coagulation of the constituents of the meat during cooking producing a unit of the desired cross section. However, this known method has two disadvantages. Firstly, the action of pressing the meat into the containers tends to cause movement between the various parts or pieces of the meat during loading, with the result that there is a lack of control over the final distribution of the meat therein and the quality of successive slides in respect of bulk density and the proportion of fat to lean or grain direction may vary greatly. Secondly, there is the possibility of air becoming entrapped in the containers during loading with the result that the resulting units of cooked meat may contain voids which will also upset the uniformity of the slices that can be produced.

The object of the invention is to provide an apparatus to overcome these problems.

In its broadest aspect, the invention relates to apparatus which is specifically adaptable for use in the preparation of units of cooked meat providing slices of uniform cross section and substantially uniform quality by a method comprising the steps of arranging the meat in a trough in such a manner that the distribution of fat and lean and the grain direction of the meat is substantially uniform, evacuating air from the trough whilst reducing the cross-sectional and longitudinal dimensions of the trough so as to compress the meat into a unit of the desired cross section, bodily sliding the unit so formed whilst still under compression into a tubular container having the desired internal cross section, and cooking and cooling the meat in said container whilst maintaining longitudinal compression thereon.

The invention is described further with reference to the accompanying drawings wherein:

FIG. 1 shows in longitudinal cross section a meat mould in accordance with the invention, FIGS. 2–7 show diagrammatic longitudinal cross sections of apparatus in accordance with the invention at different stages of its operative cycle.

FIG. 8 is a diagrammatic side elevation of an alternative form of apparatus in accordance with the invention, and FIG. 9 is a part longitudinal section of a modified form of the apparatus of FIG. 8.

Referring to FIG. 1, the mould comprises a tubular stainless steel body 1 of square or round-topped cross section (although it will be understood that alternative cross sections could be employed), the tube being open ended but provided at one end with inwardly extending flanges 3. These flanges 3 retain inside the tube a spring 4 inserted from the first end of the tube, the spring being a steel coil spring 4 adapted when compressed to exert a pressure of between 4 and 20 lbs./sq. in. of the cross section of the body and being nickel plated to resist corrosion. The spring is a sliding fit within the body 1. Adjacent the other end of the body are apertures 7 in the wall of the tube adapted to receive a removable staple 8, adapted to retain plugs 5,6 within the tube. The plugs 5,6 are moulded from polypropylene selected so as to be free from toxic plasticizers or pigments, to have adequate strength at cooking temperatures so as not to distort under the pressure applied by the spring 4 when compressed, and not to become excessively brittle under refrigeration. The plugs should be dimensioned so as to be a sliding fit within the tube at normal ambient temperatures but to engage the tube tightly at cooking temperatures as a result of thermal expansion. This tight engagement prevents excessive extrusion of juices from the meat during cooking. The body may be provided before use with a removable liner of synthetic plastic film.

Referring now to FIGS. 2–7, a channel shaped loading chamber 10 is formed by the side walls of a housing 11 and a base platform 12 carried by a pneumatic ram 13. One end of the forming chamber is closed by the head 15 of a further pneumatic ram 16, which head includes a sliding portion 18 so as to accommodate itself to the position of the platform 12.

At the other end of the chamber 10 is an end plate 19 having an aperture 20 corresponding in size to the cross section of the loading chamber 10 when the platform 12 is raised by the ram 13 and the chamber is closed by an airtight lid 21. From the end plate extends a platform 22 adapted to support a mould assembly as described with reference to FIG. 1 alignment with the forming chamber with its unflanged end in contact with the end plate 19. The mould assembly is held on the platform by a clamp 27 engaging the outer (inwardly flanged) end of the mould body 1. The mould assembly is placed on the platform with the clamp released, and the clamp is then engaged to lock the assembly in place. The clamp is spring loaded to allow for slight variations in the length of the mould assemblies. A retractable airtight housing 23 is moved into place so as to surround the platform 22 and the clamped mould assembly and so as to enter airtight engagement with the end plate 19, an aperture 24 allowing air to pass between the chamber 23 and the housing 11. The chamber 23 supports a piston member 14 comprising a sleeve supporting a further pneumatic ram 14a having a piston rod extending through the sleeve to a head 25. The piston member is mounted for free longitudinal sliding movement relative to the housing 23. When the housing 23 is in the position shown in FIG. 2 the piston member is pushed into the housing to the position shown by a stop member 14b carried by a stand (not shown) which also supports the housing 11 and longitudinal rails (not shown) upon which rails the housing 23 is mounted for sliding movement between the positions shown in FIGS. 2 and 3.

In operation, and referring first to FIG. 2, a mould assembly is clamped on the platform 22, and meat is placed in the loading chamber 10, the meat being arranged so as to obtain the desired grain direction and distribution of fat and lean along the length of the chamber. The mould assembly comprises a mould body 1 inside which are placed a plug 6 and a spring 4. A plug 5 is placed at the opposite end of the chamber 10, and the meat is placed in the chamber generally between the two plugs. Referring to FIG. 3, the housing 23 is then moved into place, the lid 21 is closed and a vacuum is drawn in the housing 11 and the housing 23 through an aperture 26 in the wall of the housing 11. The vacuum drawn in the housing 23 cause atmospheric pressure external of the housing to act on the piston member 14 so that the head 25 passes through the spring 4 and engages the plug 6 so as to push the latter up to the inner end of the body 1. The ram 13 is then actuated to raise the platform 12. This results in the meat being formed in the loading chamber, which under these circumstances has a similar cross section to the body 1, into the desired configuration (see FIG. 4), whilst any air voids are removed by the action of the vacuum.

Referring now to FIG. 5, pressure is then applied to the ram 16 so that the force applied to this ram is greater than that applied by atmospheric pressure to the piston member 14, which is thus forced back down the body 1 of the mould assembly, the meat being retained under compression between the plugs 5 and 6 and being moved without disarrangement into the body of the mould assembly, until the plug 5 is within the inner end of the mould body, and the spring 4 is compressed between the end of the mould body, and the spring 4 is compressed between the plug 5 and the flanges 3. As shown in FIG. 6, pressure is then applied to the ram 14a, resulting in the sleeve of the piston member 14 being forced back until a collar 14c on the sleeve of the piston member 14, abuts against a stop member 23a inside the housing 23 so as to provide reaction for the application of additional pressure of the meat within the mould.

Then, as shown in FIG. 7, the pressure on the ram 14 is released, and after breaking vacuum the cover chamber 23 is withdrawn to the position shown in FIG. 2; the staple 8 is inserted into the apertures 7 so as to retain the plug 5, after which the clamp can be released and the mould assembly removed, whereupon the rams 13 and 16 can be retracted and the apparatus is ready to carry out another cycle. The head 15 of the ram 16 may be provided with grooves to assist the insertion of the staple 8.

In an alternative embodiment of the method of the invention, the same apparatus is used, but the mode of use is slightly different. Instead of the spring 4 being placed in the mould assembly before use, it is placed between the plug 5 and the ram head 15, and the ram head 25 acts directly on the plug 6. The remainder of the operating sequence is the same except that the spring is on the opposite side of the meat, and that on reaching the stage shown in FIG. 7, the staple 8 is inserted so as to retain the spring in the mould body 1. This embodiment has the disadvantage that the capacity of the trough is reduced by the presence of the spring therein during loading.

FIGS. 8 and 9 illustrate alternative embodiments of the invention in which the housing 23 of the previous embodiment is dispensed with. Referring first to FIG. 8, in which the same reference numerals have been utilised to indicate parts corresponding to equivalent parts in the embodiment of FIGS. 2–7, a loading chamber 10 is defined, within a housing 11 supported on a base 100, by the side walls of the housing, a base platform 12 carried by a double acting pneumatic ram 13, and an airtight lid 21. Acting from one end of the chamber 10 is a double acting pneumatic ram 16, shown in its retracted position with its head 15 flush with the end of the chamber 10. At the other end of the chamber 10, is an end plate 19 having an aperture 20 corresponding in cross section to that of a mould to be loaded. The aperture is normally closed by an airtight gate member 101 which may be retracted by means of a pneumatic ram 102. A mould assembly in accordance with FIG. 1 is supported in the apparatus by means of end cradles 103 and 104. The cradle 103 is carried by the end plate 19 and is shaped so as to support the one end of the mould assembly in exact alignment with the aperture 20. The other end of the mould assembly is supported by the cradle 103 which is carried by a pressure plate 105. The pressure plate 105 is guided for longitudinal movement by guide rods 111 passing through a stationary stop plate 106 to an actuator plate 107. The pressure plate may be moved towards the housing 11 so as to clamp a mould assembly between it and the end plate 19 by means of a double acting pneumatic ram 112 acting through a two armed lever 108 on the actuator plate 107. The plates 105 and 106 are provided with clearance apertures for the piston head 25 of a double acting pneumatic ram 14 having a stroke long enough to project the head 25 right through a mould assembly mounted on the cradles 103, 104 up to a position immediately adjacent the gate member 101.

In operation, a mould assembly (less the plugs 5 and 6) is placed on the cradles 103, 104 and the mould body 1 (see FIG. 1) is clamped in place by actuating the ram 112 (FIG. 8). The lid 21 is opened and the plugs 5 and 6 are placed at either end of the chamber 10, after which the meat to be pressed is arranged between the plugs and the lid 21 closed. A vacuum is then drawn in the chamber 10 through a pipe 26 connected to a vacuum reservoir 110 housed in the base 100, whilst the ram 13 and the ram 16 are actuated so as to form the meat in the chamber 10 to a desired cross section and to compress it between the plugs 5 and 6. Meanwhile the ram 14 is also actuated to bring its head adjacent the gate member 101.

The vacuum in the chamber 10 is then released, and the ram 102 is actuated to withdraw the gate member, whilst the pressure applied to the ram 14 is exhausted through a restrictor valve thus ensuring that a counterpressure is maintained by it on the meat as the latter, between the plugs 5 and 6, is forced out of the chamber 10 into the body 1 (see FIG. 1) of the mould by the action of the ram 16, to which pressure is still applied. When the ram 16 reaches the end of its stroke, having forced the meat and both plugs into the mould, pressure is briefly reapplied to the ram 14 so that the meat is given an additional final pressing between the two rams. Then the staple 8 in inserted as in the previous embodiment, and all the rams are returned to their original positions, thus releasing the mould and readying the apparatus for a further cycle.

Although of simplified construction as compared with the embodiment of FIGS. 2–7, the gate 101 presents a cleaning and leakage problem, and the meat is not maintained under vacuum during its transfer into the mould. The modifications shown in FIG. 9, which essentially comprise making the mould body itself an extension of the vacuum chamber, overcome both these problems. As compared with the embodiment of FIG. 8, the gate 101 and its associated ram 102 are omitted, as are also the actuator plate 107, the ram 112 and the lever 108. In place of the ram 112, the clamping plate 105 is urged into a clamping position by springs 113 surroudning the guide rods 111, the springs acting between a reaction plate 114 and the clamping plate 105 and passing through clearance apertures in the stop plate 106. To allow placing of a mould on the cradles 103, 104, the clamping plate 105 is drawn back against the stop plate 106 by the head 25 of the ram 14 when fully retracted. The piston rod of the ram passes through a vacuum tight seal in the plate 105. In place of the gate 101 and its ram 102, an inflatable ring seal 115 is provided in a channel section housing 116 surrounding the opening 20.

In operation, the ram 14 is fully retracted so as to enable the body 1 of a mould assembly to be placed on the cradles 103, 104 between the housing 116 and the clamping plate 105, which carries a rubber seal 117 engageable with the adjacent end of the mould body. The lid 21 is opened, and the plugs 5 and 6 are placed at either end of the chamber 10, after which the meat to be pressed is arranged between the plugs and the lid closed. A vacuum is then drawn in the chamber as previously described, whilst the rams 13, 14 and 16 are all actuated and the seal ring 116 is inflated. Not only do the rams form the meat in the chamber 10, but the springs 113 cause the clamping plate 105 and its ring 117 to form a vacuum tight closure at one end of the mould body 1 whilst forcing the other end of the body into the ring seal 116 whose inflation provides a vacuum tight connection between the mould and the housing 11. Moreover, the seal 116 closes off the holes in the mould body which are provided to receive the staple 8 (see FIG. 1). Thus a vacuum is drawn within the mould body via the aperture 20, as well as in the chamber 10.

The pressure applied to the ram 14 is then exhausted through a restrictor valve thus ensuring that a counter pressure is maintained by it on the meat as the latter, still under vacuum and between the plugs 5 and 6, is forced out of the chamber 10 into the body 1 of the mould by the action of the ram 16, to which pressure is still applied. When the ram 16 is fully extended, pressure is briefly reapplied to the ram 14 to give the meat a final pressing, the vacuum in the chamber 10 is broken, and the ram 14 is retracted so as to draw the clamping plate 105 back against the stop plate 106. The now compressed spring 4 (see FIG. 1) within the mould, acting between the flange 3 (see FIG. 1) of the mould body 1 and, through the plugs 5 and 6 and the compressed meat therebetween, the head 15 of the ram 16, causes the mould body to move with the clamping plate, thus withdrawing its other end from the sealing ring 116 and uncovering the holes in the mould body so as to permit insertion of the staple 8. The rams 13 and 16 are then retracted, allowing the loaded mould to be removed and leaving the apparatus ready for a further operating cycle.

In each case, the meat placed in the trough is pressed into shape by pressure from several directions and on withdrawal of air from the trough is held between two end walls formed by plates, or a plate and a ram head, whilst being transferred from the trough to the container; held like this, the arrangement of the meat cannot be disturbed during transfer. Moreover, once in the container, the meat is subjected to continued compression by the spring which moves the plate 6 during cooking to take up any shrinkage, and which can also accommodate variations in the amount of meat placed in the trough at any one loading.

I claim:

1. A meat press for use in preparing units of cooked meat of substantially uniform cross-section and quality, comprising a trough with an openable air-tight cover, said trough having outer and inner ends formed with aligned openings, means for supporting and securing a tubular container of comparable cross section to the trough in end to end alignment therewith and for preventing the ingress of air to said trough through said container, means to evacuate air from the trough and first ram means having a line of action extending through the trough from said outer end thereof and through said outer and inner ends for pushing a meat unit out of said trough through said inner end into a container, characterized by the provision of second ram means having a line of action extending through the position of a container supported on said supporting and securing means, said second ram means having a stroke of a length to extend substantially through an aligned container to a point adjacent said trough inner end for applying a counter pressure resisting movement of said first ram means to maintain meat being placed within a container under compressing by said ram means at substantially all times during pushing of a meat unit out of said trough into said container.

2. Apparatus according to claim 1, wherein the means for preventing ingress of air to said trough through said container is a withdrawable airtight cover for said support means and said container, and said second ram is carried by said cover.

3. Apparatus according to claim 2, wherein said second ram means is a piston member mounted for free longitudinal sliding movement in said withdrawable airtight cover.

4. A mould assembly for use in preparing units of cooked meat having substantially uniform cross-section and quality, comprising in combination a tubular container open at both ends, said container having two spaced plug means extending laterally of said container and slidable therein, a compression spring to one side of said two plug means and having a sliding fit within the container, and means at each end of the container to retain said spring and the plug means therein, said spring being hollow and of a section closely approaching the section of the container in size and the retaining means engaging the spring having an opening therethrough aligned with the spring interior, said spring and said retaining means combined defining an opening through which a plunger may be passed into the container through the spring into direct engagement with the one of the plug means engaged by the spring, the retaining means at at least one end of the container being removable.

5. A mould assembly according to claim 4 wherein the plug means are moulded from polypropylene free from toxic plasticisers and pigments, and selected to resist both distortion due to pressure of the spring under the highest temperature attained during the cooking step and fracture due to brittleness at the lowest temperature attained during the cooling step, said plug means having a good sliding fit with the container when the container and the plug means are at normal ambient temperatures and tightly engage the container at elevated temperatures.

6. A mould assembly according to claim 4 wherein the spring is adapted when compressed to exert a pressure of between 4 and 20 lbs/sq.in. of the cross-section of the body.

7. Apparatus for preparing units of cooked meat providing slices of uniform cross-section and substantially uniform quality comprising:

a. a meat press comprising a trough with an openable airtight cover, means for supporting and securing a tubular container of comparable cross-section to the trough in end to end alignment therewith and for preventing the ingress of air to said trough through said container, said trough having outer and inner ends formed with aligned openings, means to evacuate air from the trough, and a first ram having a line of action extending through the trough from said outer end thereof and through said outer and inner ends for pushing a meat unit out of said trough through said inner end into a tubular container, characterized by the provision of a second ram having a line of action extending through the position of a container when supported on said supporting and securing means, said second ram having a stroke of a length to extend substantially through a supported container and being adapted to apply a counterpressure resisting movement of said first ram whereby meat being placed within a container is compressively engaged by said rams at substantially all times during pushing of a meat unit out of said trough into said container;

b. a plurality of mould assemblies each comprising in combination a tubular container open at both ends, two plug means extending laterally of said container and slidable therein, a compression spring to one side of the plug means and adapted to be a sliding fit within said container, and means at each end of said container to retain said spring and the plug means therein, said spring being hallow and of a size to receive said second ram for engagement with the plug means engaged by said spring, and the retaining means for said spring having an opening therethrough for said second ram, the retaining means at at least one end of said container being removable.

8. Apparatus according to claim 7, wherein the means for preventing ingress of air to said trough through said container is a withdrawable airtight cover for said support means and said container, and said second ram is carried by said cover.

9. Apparatus according to claim 8, wherein said second ram means is a piston member mounted for free longitudinal sliding movement in said withdrawable airtight cover.

* * * * *